Feb. 20, 1951 H. D. ELSE ET AL 2,542,016
EXPLOSION-PROOF DYNAMOELECTRIC MACHINE
Filed April 6, 1949
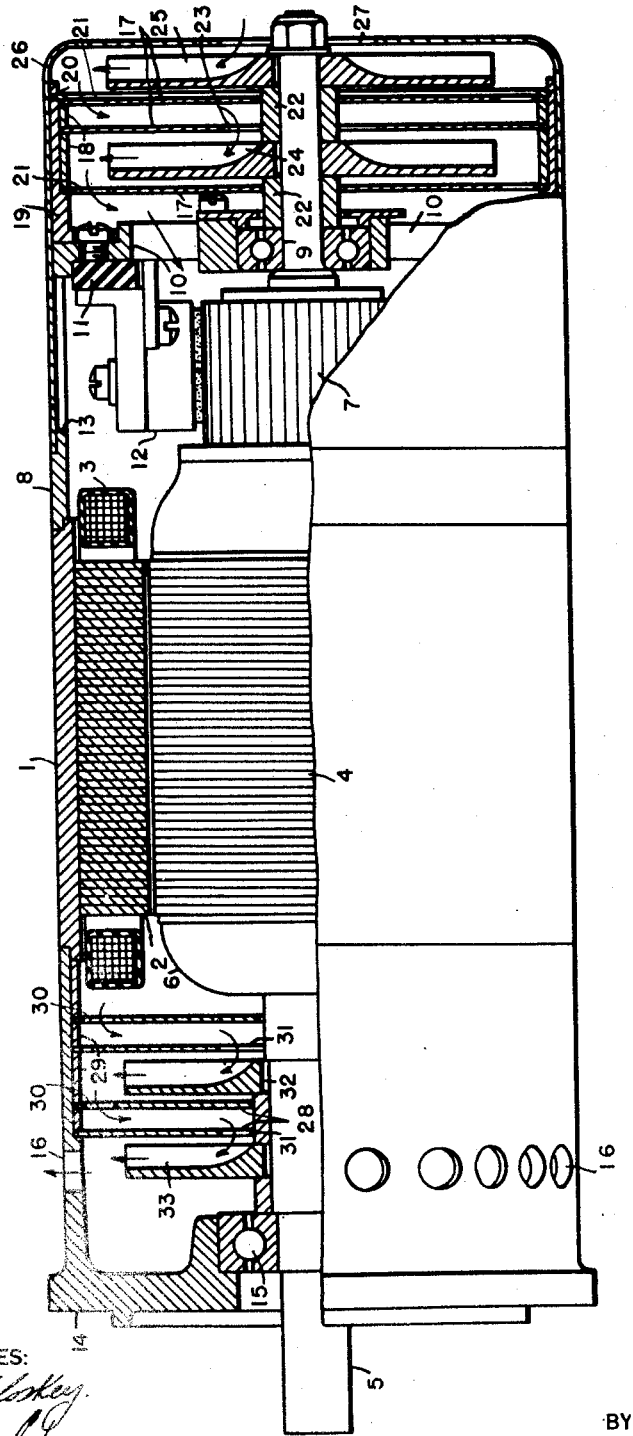
WITNESSES:
E. A. McCloskey.
New L. Groome
INVENTORS
Harry D. Else and
Dwain E. Fritz.
BY
T. P. Lyle
ATTORNEY Patented Feb. 20, 1951

2,542,016

UNITED STATES PATENT OFFICE 2,542,016

EXPLOSION-PROOF DYNAMOELECTRIC MACHINE

Harry D. Else, Lima, and Dwain E. Fritz, Cleveland, Ohio, assignors to Westinghouse Electric Corporation, East Pittsburgh, Pa., a corporation of Pennsylvania Application April 6, 1949, Serial No. 85,855

9 Claims. (Cl. 171—252)

1

The present invention relates to explosion-proof dynamo-electric machines and, more particularly, to an explosion-proof machine of light weight and small size.

Dynamo-electric machines intended for use in hazardous atmospheres, or in locations where explosive or inflammable gases or vapors may get into the interior of the machine and be ignited, are required to be of explosion-proof construction. Such machines must be built so that they are capable of withstanding the pressures developed by an explosion within the machine, and so that no flame or gas resulting from the explosion is emitted from the machine at a high enough temperature to ignite combustible gases or vapors in the air outside the machine.

In the conventional construction of explosion-proof machines, the machine is totally enclosed in a housing or frame structure which is of sufficiently heavy construction to withstand internal explosion pressures, and which has long, close fits between adjoining parts, so that any gas which may escape through such joints is cooled to a safe temperature before it reaches the outside. Since such a machine is completely enclosed and, in effect, sealed, it cannot be effectively ventilated, and the heat generated in the machine can be removed only by circulation of the internal air within the housing, which carries the heat to the housing surfaces, from which it is dissipated by radiation, or otherwise. This inadequate ventilation requires a machine of given rating to be considerably larger in physical size than a machine of the usual open construction, in order to prevent overheating. The conventional construction of explosion-proof dynamo-electric machines, therefore, results in a machine of large physical size to prevent overheating, and of heavy, massive construction to withstand internal explosion pressures. In many applications of explosion-proof machines, the size and weight are not particularly important, but in such applications as motors and generators for use on aircraft, the great weight and large size of conventional explosion-proof machines cannot be tolerated, and explosion-proof motors or generators of conventional construction cannot be used on aircraft, or in other applications where the weight and size must be kept as small as possible.

An explosion-proof dynamo-electric machine of small size and light weight, which is suitable for aircraft use, is disclosed and claimed in a copending application of H. D. Else et al., Serial No. 85,854, filed April 6, 1949, and assigned to the Westinghouse Electric Corporation. The machine disclosed in that application is ventilated by continuous circulation of outside air therethrough, so that adequate ventilation is obtained, and internal pressures are relieved, thus allowing the size and weight of the machine to be kept small. The required explosion-proof characteristics are obtained by flame-suppressing means interposed in the path of the air, so that air or gases entering or leaving the machine must pass through the flame-suppressing means, which consists of a series of baffles arranged to cause the air or gas to follow a long circuitous path so that flame or hot gas from an internal explosion is cooled to a safe temperature before reaching the outside of the machine. This construction is effective in preventing the emission of flame or hot gases resulting from an internal explosion, but the presence of the baffles interferes to some extent with the free flow of ventilating air, so that the ventilation of the machine is not as effective as that of a conventional open machine, and the physical size of a machine of given rating is somewhat larger than that of a corresponding open machine.

The principal object of the present invention is to provide an improved, lightweight explosion-proof dynamo-electric machine which is effectively ventilated by circulation of outside air so that the size of a machine of given rating can be kept as small as possible.

Another object of the invention is to provide an explosion-proof dynamo-electric machine which is ventilated by circulation of outside air through the machine, with flame-suppressing means interposed in the path of air or other gases entering or leaving the machine, and in which the flame-suppressing means includes fan means for assisting the flow of air therethrough and for producing turbulence in the air or gas which, in effect, acts as a barrier to the propagation of flame from the inside of the machine.

A more specific object of the invention is to provide an explosion-proof dynamo-electric machine which is ventilated by circulation of outside air through the machine, and in which explosion-proof characteristics are provided by the use of flame-suppressing means interposed in the path of air or other gases entering or leaving the machine, the flame-suppressing means including baffles for causing the air or gas to follow a long, circuitous path, and fans disposed between the baffles to assist the flow of air, so as to obtain improved ventilation, and to produce turbulence, which aids in preventing the propagation of flame through the flame-suppressing means.

Other objects and advantages of the invention will be apparent from the following detailed description, taken in connection with the accompanying drawing, the single figure of which is a view, partly in elevation and partly in longitudinal section, of an explosion-proof dynamo-electric machine embodying the invention.

The invention is shown in the drawing embodied in a direct-current motor for aircraft use, although it will be obvious that the invention is not limited to this particular type of motor, but may be applied to any type of dynamo-electric machine for use in any application where light-weight and small physical size are important.

The machine shown in the drawing for the purpose of illustration has a generally cylindrical frame 1. Pole pieces 2 are supported on the frame 1 and carry field coils 3. The machine also has a rotor member or armature 4, mounted on a shaft 5, and carrying suitable armature windings 6 which are connected to a commutator 7.

A bracket member 8 is secured in any suitable manner to the right-hand end of the frame 1. The bracket member 8 supports a bearing 9 for the shaft 5 and is provided with a plurality of relatively large, unobstructed openings 10 for the passage of ventilating air. A rocker ring 11 is secured to the inside of the bracket member 8 and supports brushholders 12 of any suitable type. Openings 13 may be provided in the bracket member 8 to permit access to the brushes, these openings being normally closed, as explained hereinafter. The left-hand end of the frame 1 is open for unrestricted passage of ventilating air, and a mounting bracket 14 may be secured to the frame 1 to mount the motor in place. A bearing 15 for the shaft 5 is supported in the bracket 14. The bracket 14 may be considered as representing any suitable external structure for supporting or mounting the motor and for carrying the bearing 15, and it is provided with an annular series of openings 16 for the passage of ventilating air. It will be seen that the frame 1 and bracket member 8 form an enclosing frame structure for the machine which has large openings at the ends for substantially unrestricted passage of ventilating air, so that the machine can be adequately ventilated by continuous circulation of outside air.

In order to make the machine explosion-proof, flame-suppressing means are provided at both ends of the machine, which form, in effect, labyrinth seals to cause air or gas to follow a long, circuitous path. The flame-suppressing means at the right-hand end of the machine comprises three annular, sheet metal baffles 17. The baffles 17 are spaced apart by means of annular spacers 18, and are supported in a bracket extension 19, which may be secured in any suitable manner to the bracket member 8, the baffles 17 and spacers 18 being seated against a shoulder on the bracket extension 19 and held in place by a retaining ring 20. Each of the two outside baffles 17 has an annular series of holes 21 near the outer periphery for the passage of ventilating air, the inner peripheries of these baffles having a very small clearance with collars 22 secured to the shaft 5. The center baffle 17 has a relatively large central opening 23 surrounding the shaft. A fan or blower 24 is mounted on the shaft 5 in the space between the center baffle and the baffle nearest the interior of the motor, and preferably a second fan 25 is mounted on the shaft 5 outside the outermost baffle. Air is directed into the fan 25 by means of a hood or cover 26, which, in effect, serves as an additional baffle member. The cover 26 has a large central opening 27 for the entrance of air and fits tightly over the bracket member 8 and bracket extension 19, thus closing the openings 13 in the bracket. The cover 26 is removable, so as to permit access to the brushes through the openings 13, but normally closes these openings with a substantially gas-tight joint. It will be seen that air enters the machine at the right-hand end through the opening 27 and flows into the machine in a long, circuitous path, passing through the fans 24 and 25 and the openings 21 and 23 in the baffles 17, as indicated by the arrows.

The flame-suppressing means at the left-hand end of the machine comprises four annular baffle members 28 which are spaced apart by annular spacer members 29 and clamped between the frame 1 and a shoulder on the bracket member 14. Alternate baffle members 28 have a series of holes 30 near the outer periphery for the passage of air, and they have a small clearance with the shaft 5, or with a collar on the shaft. The other two baffle members 28 have large central openings 31 surrounding the shaft. A fan 32 is mounted on the shaft 5 between the two center baffles 28, and a second fan 33 is preferably mounted on the shaft outside the baffles. It will be apparent that air, or other gas, leaving the machine follows a long, circuitous path through the openings 30 and 31 and the fans 32 and 33, as indicated by the arrows, and escapes through the openings 16 in the bracket 14.

Under normal conditions of operation, the machine is ventilated by a continuous flow of ventilating air which enters through the flame-suppressor at the right-hand end, passes through the machine, and is discharged through the flame-suppressor at the left-hand end. The use of a plurality of fans results in moving a large mass of ventilating air through the machine, so that very effective ventilation is obtained. The location of the fans between the baffles in the flame suppressors eliminates any obstructing effect which the presence of the baffles would otherwise cause, while the baffles themselves provide shrouding for the fans. Thus, the heat generated in the motor is effectively removed, and the size of the machine can be kept small.

In case of an internal explosion in the motor, the flame and hot gases resulting from the explosion tend to travel in both directions. In order to reach the outside of the motor, however, the flame and gas must pass through the long, circuitous path provided by the baffles and fans. If an explosion occurs within the motor when it is at rest, or at the moment of starting, the thermal capacity of the fans and baffles is relatively high, since they are cold at that time, and the hot gas is cooled by passing over a large area of cold metal surface, which removes heat from the gas faster than it is generated by combustion of the gas, so that the flame is quenched and the gas is cooled to a safe temperature before it reaches the outside. When the machine is running, with the fans rotating, the rotation of the fans greatly accelerates heat transfer from the gas, and, in addition, the fans produce a condition of violent turbulence in the regions adjacent the tips of the blades. A turbulently moving mixture of combustible gases can be ignited only with the greatest difficulty, and the masses of turbulent air and gas adjacent the outer circumference of the fans constitute, in effect, a barrier to the propagation of flame from the inside of the machine to the outside. Thus, the flame suppressors reduce the temperature of gases passing through them, by the cooling effect of the long, circuitous path which the gases must follow in contact with metal surfaces, and prevent the emission of flame, both because of this cooling effect and because of the presence of the barrier regions of turbulently moving gas.

It should now be apparent that an explosion-proof motor has been provided which is very effectively ventilated by continuous circulation of outside air therethrough, so that the machine can be made of small physical size, and in which the emission of flame or hot gas is positively prevented by the flame-suppressing means interposed in the path of air or gas entering or leaving the machine. The provision of fans between the baffles within the flame suppressors greatly improves the ventilation, and also improves the effectiveness of the flame suppressors by creating regions of turbulence which form barriers to the propagation of flame. Since the machine is not tightly sealed, the internal pressures resulting from an explosion do not build up to high values, and it is not necessary to use heavy, massive construction, as in conventional explosion-proof machines, so that the weight of the machine is kept small. For the same reason, the flame suppressors can be made of light sheet metal and add very little weight to the machine.

A specific embodiment of the invention has been shown and described for the purpose of illustration, but it is to be understood that the invention may be applied to any type of dynamo-electric machine, and that it is not limited to the specific details of construction shown, but, in its broadest aspects, it includes all equivalent embodiments and modifications which come within the scope of the appended claims.

We claim as our invention:

1. An explosion-proof dynamo-electric machine having a stator member and a rotor member, said stator member including enclosing means for the machine, said enclosing means permitting flow of ventilating air through the machine, and labyrinth means interposed in the path of said air, the machine being otherwise completely enclosed, said labyrinth means comprising means for causing air or other gas to follow a long, circuitous path, the labyrinth means also including fan means disposed in said circuitous path.

2. An explosion-proof dynamo-electric machine having a stator member and a rotor member, said stator member including enclosing means for the machine, said enclosing means having openings to permit the flow of ventilating air through the machine, and labyrinth means disposed adjacent said openings, the machine being otherwise completely enclosed so that air or gas entering or leaving the machine must pass through the labyrinth means, said labyrinth means comprising means for causing air or other gas to follow a long, circuitous path, the labyrinth means also including fan means disposed in said circuitous path.

3. An explosion-proof dynamo-electric machine having a stator member and a rotor member, said stator member including enclosing means for the machine, said enclosing means permitting flow of ventilating air through the machine, and labyrinth means interposed in the path of said air, the machine being otherwise completely enclosed, said labyrinth means comprising spaced baffle members arranged to cause air or other gas to follow a long, circuitous path, the labyrinth means also including fan means disposed between said baffle members.

4. An explosion-proof dynamo-electric machine having a stator member and a rotor member, said stator member including enclosing means for the machine, said enclosing means having openings to permit the flow of ventilating air through the machine, and labyrinth means disposed adjacent said openings, the machine being otherwise completely enclosed so that air or gas entering or leaving the machine must pass through the labyrinth means, said labyrinth means comprising spaced baffle members arranged to cause air or other gas to follow a long, circuitous path, the labyrinth means also including fan means disposed between said baffle members.

5. An explosion-proof dynamo-electric machine having a stator member and a rotor member, said stator member including an enclosing frame structure, said frame structure permitting the flow of ventilating air through the machine, and flame-suppressing means disposed in the path of air entering and leaving the machine, the machine being otherwise completely enclosed so that air or other gas entering or leaving the machine must pass through the flame-suppressing means, said flame-suppressing means comprising means for causing air or other gas to follow a long, circuitous path and fan means disposed in said circuitous path within the flame-suppressing means.

6. An explosion-proof dynamo-electric machine having a stator member and a rotor member, said stator member including an enclosing frame structure, said frame structure permitting the flow of ventilating air through the machine, and flame-suppressing means disposed in the path of air entering and leaving the machine, the machine being otherwise completely enclosed so that air or other gas entering or leaving the machine must pass through the flame-suppressing means, said flame-suppressing means comprising spaced baffle members arranged to cause air or other gas to follow a long, circuitous path, and fan means disposed between said baffle members within the flame-suppressing means.

7. An explosion-proof dynamo-electric machine having a stator member and a rotor member, said stator member including an enclosing frame structure, said frame structure permitting the flow of ventilating air through the machine, and flame-suppressing means disposed in the path of air entering and leaving the machine, the machine being otherwise completely enclosed so that air or other gas entering or leaving the machine must pass through the flame-suppressing means, said flame-suppressing means comprising a plurality of spaced, parallel baffle plates having openings for the passage of air or gas, the openings of adjacent baffle plates being displaced from each other to cause air or gas to follow a long, circuitous path, and fan means disposed between said baffle plates within the flame-suppressing means.

8. An explosion-proof dynamo-electric machine having a stator member and a rotor member, said stator member including a frame structure which has openings at the ends to permit circulation of ventilating air through the machine, and flame-suppressing means disposed adjacent each end of the frame structure, the machine being otherwise completely enclosed so that air or other gas entering or leaving the machine must pass through the flame-suppressing means, each of said flame-suppressing means comprising a plurality of spaced, parallel baffle plates arranged to cause air or gas to follow a long, circuitous path, and fan means disposed between said baffle plates within the flame-suppressing means.

9. An explosion-proof dynamo-electric machine having a stator member and a rotor member, said stator member including a frame structure which has openings at the ends to permit circulation of ventilating air through the machine, and flame-suppressing means disposed adjacent each end of the frame structure, the machine being otherwise completely enclosed so that air or other gas entering or leaving the machine must pass through the flame-suppressing means, said rotor member having a shaft which extends through the flame-suppressing means, each of said flame-suppressing means comprising a plurality of spaced, annular baffle plates encircling the shaft and providing openings for the passage of air or gas, the openings of adjacent baffle plates being spaced apart radially to provide a long, circuitous path for air or gas, and at least one fan mounted on the shaft between said baffle plates within the flame-suppressing means.

HARRY D. ELSE.
DWAIN E. FRITZ.

REFERENCES CITED

The following references are of record in the file of this patent:

UNITED STATES PATENTS

| Number | Name | Date |
| --- | --- | --- |
| 1,720,364 | Holmes | July 9, 1929 |
| 2,452,248 | Lee | Oct. 26, 1948 |